United States Patent [19]

Lindert et al.

[11] Patent Number: 4,963,596
[45] Date of Patent: Oct. 16, 1990

[54] TREATMENT AND AFTER-TREATMENT OF METAL WITH CARBOHYDRATE-MODIFIED POLYPHENOL COMPOUNDS

[75] Inventors: Andreas Lindert, Troy; John R. Pierce, Huntington Woods; David R. McCormick, Madison Heights; William D. Zimmermann, Farmington Hills, all of Mich.

[73] Assignee: Henkel Corporation, Ambler, Pa.

[21] Appl. No.: 128,673

[22] Filed: Dec. 4, 1987

[51] Int. Cl.$^5$ .............................................. C08F 12/24
[52] U.S. Cl. ..................................... 526/313; 526/342; 525/30
[58] Field of Search .................... 526/313, 342; 525/30

[56] References Cited

U.S. PATENT DOCUMENTS

| | | | |
|---|---|---|---|
| 4,376,000 | 3/1983 | Lindert | 106/14.11 |
| 4,424,272 | 1/1984 | Taylor | 526/312 |
| 4,433,015 | 2/1984 | Lindert | 427/409 |
| 4,457,790 | 7/1984 | Lindert et al. | 427/409 |
| 4,517,028 | 5/1985 | Lindert | 524/543 |
| 4,544,727 | 10/1985 | Ema et al. | 526/342 |

FOREIGN PATENT DOCUMENTS

| | | | |
|---|---|---|---|
| 2713476 | 9/1978 | German Democratic Rep. | 526/342 |
| 38-10047 | 6/1963 | Japan | 526/342 |
| 1138610 | 6/1986 | Japan | 526/312 |
| 902628 | 8/1962 | United Kingdom | 526/342 |
| 972897 | 10/1964 | United Kingdom | 526/342 |

Primary Examiner—Joseph L. Schofer
Assistant Examiner—N. Sarofim
Attorney, Agent, or Firm—Ernest G. Szoke; Wayne C. Jaeschke; Michael P. Brennan

[57] ABSTRACT

A metal treatment solution comprising an effective amount of a soluble or dispersible compound which is a derivative of a polyphenol. Novel derivatives of polyphenol compounds useful in the treatment of the surface of metal articles is provided. Novel surface treatment solutions or dispersions, and methods for using these solutions is provided. Carbohydrate-modified polyphenol compounds are utilized in the present invention. The molecular weight of the polyphenols used in the preparation of derivatives of the present invention are in the range of about 360 to about 30,000 or greater. The resulting derivatives will typically have a molecular weight of up to about 2,000,000 with molecular weights within the range of about 700 to about 70,000 being preferred.

18 Claims, No Drawings

TREATMENT AND AFTER-TREATMENT OF METAL WITH CARBOHYDRATE-MODIFIED POLYPHENOL COMPOUNDS

BACKGROUND AND SUMMARY OF INVENTION

The present relates to the field of protective and/or decorative surface treatment of articles, particularly metals, plastics, and the like.

The present invention comprises novel derivatives of polyphenol compounds useful in the treatment of the surface of metal articles. The present invention also encompasses novel surface treatment solutions or dispersions, and methods of using these solutions or dispersions.

In accordance with the present invention, novel compositions, solutions and dispersions, and methods are provided for use in providing a protective or decorative metal surface treatment; these include the treatment of previously untreated bare metal surfaces, the post-treatment of phosphatized or conversion coated metal surfaces, the application of a paint or other decorative coating or film, and the like. The present invention additionally includes compositions and methods that are particularly useful for treating various metal surfaces including aluminum, steel and zinc metal surfaces. The compositions, solutions and dispersions, and methods of the present invention provide a coating on the metal surface which is effective in enhancing the corrosion resistance and paint adhesion characteristics of the metal surface whether previously conversion coated or not. A further and more detailed understanding of this invention can be obtained from the following disclosure. All parts and percentages are by weight unless otherwise indicated.

The need for applying protective coatings to metal surfaces for improved corrosion resistance and paint adhesion characteristics is well known in the metal finishing art as well as in other metal arts. Traditionally, metal surfaces are treated with chemicals which form a metal phosphate and/or metal oxide conversion coating on the metal surface to improve the corrosion resistance and paint adhesion thereof. The conversion coated metal surfaces are also generally rinsed or post-treated with a solution containing a hexavalent chromium compound for even greater corrosion resistance and paint adhesion.

Because of the toxic nature of hexavalent chromium, expensive wastewater treatment equipment must be employed to remove the residual chromates from plant effluent to comply with environmental regulations and to improve the quality of rivers, streams, and drinking water sources. Hence, although the corrosion resistance and paint adhesion characteristics of conversion coated metal surfaces can enhanced by an after-treatment solution containing hexavalent chromium, the disadvantages in recent years have lead to much research and development in an effort to uncover effective alternatives to the use of post-treatment solutions containing hexavalent chromium. One alternative to the use hexavalent chromium involves the use of derivatives of polyphenol compounds such as poly-vinyl phenol. Suitable derivatives and suitable treatment solutions are disclosed in the earlier U.S. Pat. No. 4,517,028, May 14, 1985; U.S. Pat. No. 4,376,000, Mar. 8, 1983 to Lindert; U.S. Pat. No. 4,433,015, Feb. 21, 1984 to Lindert; and U.S. Pat. No. 4,457,790, July 3, 1984 to Lindert, et al.; all of which are expressly incorporated herein by reference. Also see the two commonly assigned applications filed the same date herewith entitled "Treatment And After-Treatment Of Metal With polyphenol Compounds", U.S. Ser. No. 07/128672; and "Treatment And After-Treatment Of Metal With Amine Oxide-Containing polyphenol Compounds", U.S. Ser. No. 07/128756; both of which are expressly incorporated herein by reference.

Further, the art has also recognized that existing aluminum treatment systems suffer from many disadvantages.

The present relates to the use of novel derivatives of polyphenol compounds for treatment of the surface of metal articles. In accordance with the present invention, a novel composition and method are provided for in metal treatment. These compositions and methods may be employed for the treatment of previously untreated metal surfaces, particularly aluminum, or for the post-treatment of phosphatized or conversion coated metal surfaces. The present invention additionally includes compositions and methods for treating various metal surfaces including aluminum, steel and zinc metal surfaces. The compositions and methods of the present invention provide a coating on the metal surface which is effective in enhancing the corrosion resistance and paint adhesion characteristics of the metal surface whether previously conversion coated or not. A further and more detailed understanding of this invention can be obtained from the unless otherwise indicated.

DETAILED DESCRIPTION OF THE INVENTION

In a typical metal treatment operation employing a solution of this invention, the metal to be treated is initially cleaned by a chemical or physical process to remove grease and dirt from the surface and then water rinsed. The metal surface is then brought into contact with the treatment solution of this invention. Alternatively, instead of contacting the metal surface with the treatment solution of this invention immediately following the cleaning process, a conversion coating solution is applied to or otherwise used to pre-treat the metal surface in a conventional manner to form a conversion coating thereon. Then the conversion coated surface is water rinsed and the metal surface is brought into contact with the treatment solutions of the present invention.

Although solutions and/or dispersions of the invention can be effectively applied to treated or untreated metal surfaces, speaking generally the present invention is particularly useful if the metal surface has previously been conversion coated and the invention is accordingly used as a post-treatment; accordingly, as used herein, the term "post-treatment" means the treatment of a metal surface which is not bare metal, and preferably has been previously treated With a conventional conversion coating process. Such conversion coatings are well known and have been described, for example, in *Metal Handbook,* Volume II, 8th Edition, pp. 529–547 of the American Society for Metals and in *Metal Finishing Guidebook and Directory,* pp. 590–603 (1972), the contents of both of which are specifically incorporated by reference herein.

The compositions and processes of the present invention are useful in treating a broad range of metal surfaces, including metals having surfaces that have been conversion coated with suitable conversion coatings such as iron phosphate, manganese phosphate, zinc phosphate, zinc phosphate modified with calcium, nickel, or manganese ions. Examples of suitable metal surfaces include zinc, iron, aluminum and cold-rolled, polished, pickled, and hot-rolled steel and galvanized steel surfaces. As used herein, the term "metal surface" includes both untreated metal surfaces and conversion coated metal surfaces. With regard to aluminum surfaces, the compositions and methods of the present invention can be applied prior to or in place of, any additional corrosion-resistance/paint-base surface treatments.

As used herein, the term "metal surface" includes both untreated metal surfaces and conversion coated metal surfaces.

The treatment solution of the present invention comprises an effective amount of a soluble or dispersible treatment compound, frequently referred to below as a polymer Material, in a liquid, preferably aqueous, medium. The soluble or dispersible compound employed in the present invention is selected from the group consisting of any one of the following Polymer Materials a, b, c, d (characterized below), their salts, and mixtures thereof. Salts include the acid and alkaline salts thereof.

In general, the compositions and method of the present invention are similar to those disclosed in my co-pending U.S. patent application entitled TREATMENT AND AFTER-TREATMENT OF METAL WITH POLYPHENOL COMPOUNDS, Ser. No. 07/126872 filed herewith, and expressly incorporated herein by reference. However, unlike those compositions and methods, at least a portion of the final resin Polymer Material of the present invention must include a "Z" moiety and further, at least a portion of said "Z" moiety must be modified by the inclusion of a polyhydroxy alkyl-amine functionality resulting from the condensation of an amine or NH3 with a ketose, aldose, or other alkylaminopolyhydroxy compound, preferably having from about 3 to about 8 carbon atoms. Such modifications may also be made to polyphenolics other than those disclosed in my co-pending application, such as those polyphenolic derivatives described in my U.S. Pat. No. 4,376,000 issued Mar. 8, 1983; U.S. Pat. No. 4,443,015 issued Feb. 21, 1984; and U.S. Pat. No. 4,517,028 issued May 14, 1985; all expressly incorporated herein by reference. In particular, the preferred materials of the present invention are based on certain aminosaccharide derivatives of polyphenolics which have been found useful in treating metal, especially bare aluminum metal. A metal surface contacted with a treatment solution of the present invention has enhanced corrosion resistance and paint adhesion characteristics. Further understanding of this invention will be had from the following disclosure, wherein all parts and percentages are by weight unless otherwise indicated.

The polyphenol compounds of the present inventions are polymer Materials (a)–(d) below, their salts, and mixtures thereof. The treatment compositions of the present invention comprise an effective amount of a soluble or dispersible treatment compound (Polymer Material) in a carrier that is suitable for surface treatment, i.e., one that allows the selected polymer Material to be deposited or otherwise placed on the surface of, for example, a metal. The soluble or dispersible compound employed in the present invention is selected from the group consisting of any one of the following Polymer Materials (a)–(d) (characterized below), solutions or dispersions of these Polymer Materials, their salts, and mixtures thereof. Salts include the acid and alkaline salts thereof.

The methods of the present invention comprise contacting a metal surface with treatment compositions described herein.

Polymer Material (a)

In accordance with the present invention a polymer useful in metal treatment applications is selected from polymer Materials (a)–(d). Polymer Material (a) comprises a polymer material having at least one unit having the formula:

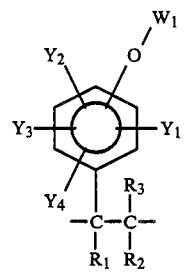

where:

$R_1$ through $R_3$ are independently selected for each of said units from the group consisting of hydrogen, an alkyl group having from 1 to about 5 carbon atoms, or an aryl group having about 6 to about 18 carbon atoms;

$Y_1$ through $Y_4$ are independently selected for each of said units from the group consisting of hydrogen, $-CR_{11}R_5OR_6$, $-CH_2Cl$, or an alkyl or aryl group having from 1 to 18 carbon atoms, or Z;

Z is

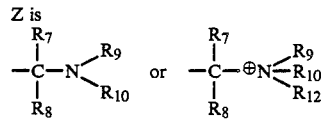

however, at least a fraction of the $Y_1$, $Y$, $Y_3$ or $Y_4$ of the final compound or material must be Z and at least a fraction of said Z must contain a polyhydroxy alkyl-amine functionality resulting from the condensation of an amine or NH3 and a ketose, aldose or other alkylaminopolyhydroxy compound having from about 3 to about 8 carbon atoms followed by reduction to an amine (from the imine);

$R_5$ through $R_{12}$ are independently selected for each of said units from the group consisting of hydrogen, an alkyl, aryl, hydroxy-alkyl, amino-alkyl, mercapto-alkyl, or phospho-alkyl moiety; $R_{12}$ can also be $-O^{(-1)}$ or $-OH$, in order to form an amine oxide or a hydroxyl amine;

$W_1$ is independently selected for each of said units from the group consisting of hydrogen; an acyl moiety; an acetyl; a benzoyl moiety; 3-allyloxy-2-hydroxy-propyl-; 3-benzyloxy-2-hydroxy-propyl-; 3-alkylbenzyloxy-2-hydroxy-propyl-; 3-phenoxy-2-hydroxy-propyl-; 3-alkylphenoxy-2-hydroxy-propyl-; 3-butoxy-2-hydroxy-propyl; 3-alkyloxy-2-hydroxy-propyl; 2-hydroxyoctyl-; 2-hydroxy-alkyl-; 2-hydroxy-2-phenyl ethyl-; 2-hydroxy-2-alkyl phenyl ethyl-; benzyl-; methyl-; ethyl-; propyl-; alkyl; allyl; alkyl benzyl-; haloalkyl-; haloalkenyl; 2-chloro-propenyl-; sodium, potassium; tetra aryl ammonium; tetra alkyl ammonium; tetra alkyl .aosphonium; tetra aryl phosphonium; or a condensation product of ethylene oxide, propylene oxide, a mixture, or copolymer thereof;

Preferred final materials are based on a vinyl phenolic moiety or methyl vinyl phenolic moiety. For example, vinyl phenol isopropenyl phenol and derivatives thereof may be used.

It will be appreciated that the depiction above represents a repeating unit that characterizes the compound or materials of the present invention; no terminating end units are depicted. The end group not depicted of the polymers of the present invention can be selected by the skilled artisan relying upon art-disclosed techniques. For example, the end groups of the polymer may either those resulting from the specific polymerization process employed or those intentionally added to alter the polymer characteristics. For example, the end groups may be hydrogen, hydroxyl, initiation fragments, chain transfer agents, disproptionation groups, or other similar methods of terminating a growing polymer chain.

Polymer Material (b)

Polymer Material (b) comprises a polymer material having at least one unit having the formula:

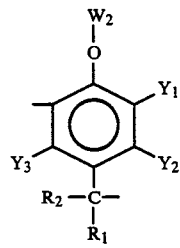

wherein:

$R_1$ through $R_2$ are independently selected for each of said units from the group consisting of hydrogen, an alkyl group having from 1 to about 5 carbon atoms, or an aryl group having from about 6 to about 18 carbon atoms;

$Y_1$ through $Y_3$ are independently selected for each of said units from the group consisting of hydrogen, $-CR_4R_5OR_6$, $-CH_2Cl$, an alkyl or aryl group having from 1 to 18 carbon atoms, or Z, Z is

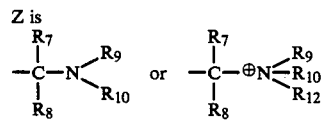

but at least a fraction of the $Y_1$, $Y_2$, or $Y_3$ of the final compound must be Z, and at least a fraction of said Z must contain a polyhydroxy alkyl-amine functionality resulting from the condensation of an amine or $NH_3$ and a ketose, aldose or other alkylaminopolyhydroxy compound having from about 3 to about 8 carbon atoms;

$R_4$ through $R_{12}$ are independently selected for each of said units from the group consisting of hydrogen, or an alkyl, aryl, hydroxy-alkyl, amino-alky, mercapto-alkyl or phospho-alkyl moiety; $R_{12}$ may also be $-OH^{(-1)}$ in order to form an amine oxide or a hydroxyl amine;

$W_2$ is independently selected for each of said units from the group consisting of hydrogen; an acyl moiety; acetyl; benzoyl; 3-allyloxy-2-hydroxy-propyl-; 3-benzyloxy-2-hydroxy-propyl-; 3-alkylbenzyloxy-2-hydroxy-propyl-; 3-phenoxy-2-hydroxy-propyl-; 3-alkylphenoxy-2-hydroxy-propyl-; 3-butoxy-2-hydroxy-propyl-; 3-alkyloxy-2-hydroxy-propyl-; 2-hydroxyoctyl-; 2-hydroxy-alkyl-; 2-hydroxy-2-phenyl-ethyl-; 2-hydroxy-2-alkyl-phenylethyl-; benzyl-; methyl-; ethyl-; propyl-; alkyl; allyl-; alkylbenzyl-; haloalkyl-; haloalkenyl; 2-chloro-propenyl-; or a condensation product of ethylene oxide, propylene oxide, a mixture, or copolymer thereof;

Polymer Material (c)

Polymer Material (c) comprises a co-polymer material wherein at least one portion of said co-polymer has the structure:

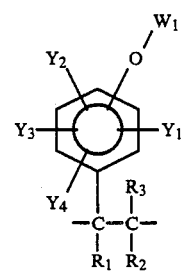

and at least a fraction of said portion is polymerized with one or more monomers having a C=C moiety. Useful include those independently selected for each of said units from the group consisting of acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-bromostyrene, p-bromostyrene, pyridine, diallyldimethylammonium salts, 1,3-butadiene, n-butyl acrylate, tert-butylamino-ethyl methacrylate, n-butyl methacrylate, tert-butyl methacrylate, n-butyl vinyl ether, tert-butyl vinyl ether, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl methacrylate, diethyleneglycol monovinyl ether, diethyl fumarate, diethyl itaconate, diethyl vinylphosphonate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-dodecyl vinyl ether, ethyl acid fumarate, ethyl acid maleate, ethyl acrylate, ethyl cinnamate, N-ethylethacrylamide, ethyl methacrylate, ethyl vinyl ether, 5-ethyl-2-vinylpyridine, 5-ethyl-2-vinylpyridine 1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, N-isobutoxymethylacrylamide, N-isobutoxymethylacrylamide, N-alkyloxymethylacrylamide, N-alkyloxymethylmethacrylamide, N-vinyl-caprolactam, methyl acrylate, N-methylmethacrylamide, α-methylstyrene m-methylstyrene, o-methylstyrene, p-methylstyrene, 2-methyl-5-vinylpyridine, n-propyl methacrylate, sodium p-styrenesulfonate, stearyl methyacrylate, styrene, p-styrenesulfonic acid, p-styrenesulfonamide, vinyl bromide, 9-vinylcarbazole, vinyl chloride, vinylidene chloride, 1-vinylnaphthalene, 2-vinylnaphthalene, 2-vinylpyridine, 4-vinylpyridine, 2-vinylpyridine N-oxide, 4-vinylpyrimidine, N-vinylpyrrolidone; and $W_1$, $Y_1-Y_4$ and $R_{1-12}$ are as in (a), above.

Within such materials, the ratio of any single monomer to any other monomer can be about 1:99 to about 99:1, preferably about about 5:1 to about 1:5, and more preferably 1.5:1 to about 1:1.5.

Polymer Material (d)—Condensate polymers

By the term "condensation polymers" is meant the following:

A condensation polymer of polymer materials (a), (b), or (c), wherein condensable forms (i.e., modified as noted below) of (a), (b), or (c), or mixtures thereof, is condensed with a second compound selected from the group consisting of phenols (preferably phenol, alkylphenol, arylphenol, cresol, resorcinol catechol, pyrogallol), tannins, (both hydrolyzable and condensed) novolak resins, lignin compounds, together with aldehydes, ketones or mixtures thereof, to produce a condensation resin product, that is a prepolymer of Polymer Material (d). This condensation resin prepolymer product is then further reacted by the addition of "Z" to at least a portion of it by reacting said resin prepolymer product with an aldehyde or ketone and a secondary amine producing a final adduct which can react with an acid and/or can be reacted with hydrogen peroxide to generate an amine oxide. The amine oxide can then be acid neutralized to form the hydroxyl amine if desired.

While this condensation product is described for convenience as being prepared by a sequential reaction, it will be appreciated that these materials can be prepared by carrying out the necessary steps in any order, or simultaneously. However, the sequence described is preferred.

It is appreciated by those skilled in the art, that the alkenylphenolic moieties of the present invention can be either randomly distributed within the copolymer and terpolymer or can be synthesized to constitute a block orientated polymer, depending upon the methods and conditions used for polymerization.

Preferred aldoses, ketoses, and derivatives for use in the above materials include, without limitation, glucose, fructose, alditols such as mannitol, aribanose, mannose, ribose, ribitol, and the like. Acids such as aldonic and aldaric acids may also be employed. Disaccharides and polysaccharides that can be easily hydrolyzed under reaction conditions to one or more of the useful aldoses and ketoses may also be employed.

The present invention further relates to the polymer metal treatment solutions comprising an effective amount of Polymer Material (a), (b), (c), (d) or mixtures thereof and to the process of treating a metal surface by contacting the metal surface with metal treatment solution. The present invention is especially useful with respect to aluminum metal surfaces.

In a typical treatment operation employing a solution and process of this invention, the metal surface to be treated is initially cleaned by a chemical or physical process, and water rinsed to remove grease and dirt from the surface. The metal surface is then brought into contact with the treatment solution of this invention, for example, by means of a squeegee roller coater. The treated metal is then dried, for example, by flash drying in a 200° F. oven for 30 seconds.

The surface treatment solutions of this invention comprise Polymer Materials (a), (b), (c), (d), or mixtures thereof (with or without the requirement that the Z moeity be present), are preferably dissolved or dispersed in a carrier suitable for depositing or otherwise placing the Polymer Material on the surface of a metal, i.e., as a metal surface treatment, metal surface post treatment, a paint, protective film, or as a component of any of the foregoing.

These Polymer Materials of the present invention may be made soluble or dispersible in water or organic solvent-type carriers. They may therefore be employed as a treatment solution when dissolved in water or in an organic solvent such as, for example, ethanol. Preferably, the Polymer Material selected is used in aqueous solution as a carrier.

Accordingly, it is highly desirable to provide or improve the water solubility or water dispersibility of the selected Polymer Material. In addition to employing the polyhydroxyalkyl-amine functionality, this is preferably done with an acid used for neutralization and/or complexation of a "Z" moiety thereof. Such acids may be organic or inorganic. Useful and preferred acids for this purpose carbonic acid, acetic acid, citric acid, oxalic acid, ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; these may be employed alone or in combination with each other and may be neutralized by conventional acid-base reactions or by complexing. In a highly preferred embodiment, the addition of water to the neutralized, overneutralized or partially neutralized treatment compounds mentioned above results in a water soluble or dispersible solution or emulsion of the polymer useful for metal treatment.

Alternately, the final Polymer Material/polyphenol compounds of the present invention can be made water soluble or dispersible by neutralization of the phenolic group with an organic or inorganic base. Suitable bases for this purpose include tetra-alkylammonium hydroxides such as tetrabutylammonium hydroxide, tetra arylammonium hydroxide, sodium hydroxide, potassium hydroxide and the like.

In a highly preferred embodiment, the final Polymer Material can be prepared such that the "Z" moiety does not require neutralization, i.e., an amine oxide or the like.

The molecular weight of the polyphenols used in the preparation of derivatives claimed in the present invention can be a dimer, but may preferably be low molecular weight oligomers or resinous polymers having molecular weights in the range of about 360 to about 30,000 or greater. The upper limit of molecular weight of materials useful in surface treatment compositions is generally determined by the functional limitation that the derivative therefrom must be soluble or dispersible in the selected carrier. The resulting derivatives of the formulae set forth hereinabove will typically have a molecular weight of up to about 2,000,000 with molecular weights within the range of about 700 to about 70,000 being preferred.

Typically, the pH of the aqueous solution will vary from about 0.5 to about 14. Generally the aqueous solution will have a pH of from about 2.0 to about 12 both for the stability of the solution and for best results on the treated metal surfaces.

It is contemplated that the compositions and treatment solutions of the present invention can be used to treat the surface of a variety of materials, particularly metal and plastic or "plastic-like" surfaces. Preferred metal surfaces include iron-, zinc- and aluminum-based metals. Preferred "plastic-like" material surfaces include resin or polymeric materials, including thermoplastic and thermosetting materials, as well as natural rubbers, mixtures of these materials, and the like.

The coating applied may be for protection or decorative in nature, or may be a preparation of the surface for another treatment, it may also serve several functions at once.

The thickness of the final dry or cured coating will depend on its purposes or functions, and may typically range from about 0.0001 mil to about 25 mils or greater. The typical and preferred metal surface treatment (such as a conversion-type protective/paint base coating) is in the range of about 0.05 mil and below, and more preferably about 0.0001 mil to about 0.05 mil. When acting as a paint or decorative and protective surface treatment, the resulting coating thickness is about 0.05 mil and above, preferably about 0.05 to about 25 mils, and more preferably about 0.05 to about 10 mils.

It is further contemplated that the treatment compounds of the present invention will generally be used in surface treatment compositions over a wide range of concentrations. It will be appreciated that the levels of useful or useful ranges will vary with many factors well-known to the skilled artisan. Useful levels of the compositions of the present invention dissolved or dispersed in a carrier may be in the range of about 0.001% to about 80 percent, depending upon the ultimate use. For example, when used as a pre- or post-treatment of a metal surface, useful levels typically include a dilute to moderate concentration of from about 0.001% to about 20%, by weight, preferably about 0.001% to about 10 percent, by weight, and still more preferably about 0.001% to about 5% by weight. Practically speaking, a concentration of 0.0025 to 1% is preferred in metal surface treatment (compositions especially for iron-, zinc-, or aluminum-based metal surfaces). However, under some circumstances (for example when transporting or storing the solution or when using it in a "dry-in-place" system), a concentrate of the solution may be preferred. Higher levels (for example, as high as 80% by weight) may also be employed when the treatment composition is part of a paint system.

Of course, the treatment solutions of the present invention can also comprise ingredients typically found in other similar treatment compositions, (e.g., conversion coating compositions) in addition to the polymer compound. For example, the treatment solution may optionally comprise an effective amount of a treatment compound according to the present invention, and from about 0.001% to about 3.0% of a metal ion. Metal ions useful for metal treatment in combination with polyphenols of this invention include first row transition metals generally, Group IV-B-metals generally, iron, nickel, cobalt, vanadium, chromium, titanium, zirconium hafnium, scandium, yttrium, lanthanum and their respective lanthanoid and Actinoid metals, as well as molybdenum and tungsten. In addition, tin, silicon, and aluminum compounds, and in particular their oxides, in combination with the materials of the present invention can be used to improve both the effectiveness or performance of the treatment solution in use. Such materials may also reduce the time of application of treatment solution to the metal surface to as short a time as about 2 to 5 seconds as might be required on a coil coating line. Complex fluoride materials may also employed. For example, suitable complex fluoride materials include: $BF_4^{(-1)}$, hexafluoride and the like.

It must be appreciated that the addition of metal ions may result in the formation of polymer-metal ion chelating compounds.

The Polymer Materials of the present invention may also be employed in surface treatment composition and surface treatment methods other than those described above. For example, the Polymer Material of the present invention may be empolyed as a component of a dry-in place system, a paint system, or as an additive in a system needing a crosslinking agent.

For example, the Polymer Materials of the present invention may be used in a film forming composition that includes a pigment, i.e. may be used as a paint. They may also be employed as an additional component in conjunction with other polymeric materials in a paint system. Such protective, functional and/or decorative surface treatment solutions preferably employ typical electrocoat/electrodeposition additives at their art—established levels. The Polymer Materials of the present invention are particularly useful in cathodic electrocoat surface treatment compositions. The polymer materials of the present invention may be employed as a solubilizing polymer and/or binder in an electrocoat paint. They may be so employed alone or in conjunction with other binder resins. For example, such paint compositions may optionally include pigments (both organic and inorganic); film forming resins; binders such as epoxys, oils, alkyds, acrylics, vinyls, urethanes, phenolics, etc.; and solvents including hydrocarbons, chlorinated aliphatics and aromatics, alcohols, ethers, ketones, esters; nitrated materials; and particulate zinc.

Further, the Mannich derivatives of the present invention when employed with other binders will also act as a crosslinking agent to produce a highly-crosslinking coating upon curing or drying of the film. Accordingly, it may be part of or all of the needed crosslinking system.

Accordingly, the compositions and materials of this invention can be used alone or in conjunction with other resins as polymeric coatings on surfaces. These coatings will crosslink or self-crosslink and can be used in conjunction with other crosslinking agents such as melamine-formaldehyde or urea-formaldehyde resins as well as phenolic resins, epoxy resins, isocyanates and blocked isocyanates. The Mannich adducts can also be used to crosslink with vinyl functionality as is present in resins such as diallylmelamine, butadiene, multifunctional acrylic oligomers, unsaturated fatty acids in alkyd resins, fatty acid modified epoxy resins, and the like.

Application of the treatment compositions of the present invention in the treatment step to a metal or other desired surface can be carried out by any conventional method. (While it is contemplated that the metal surface will preferably be a conversion coated metal surface, the treatment step can alternatively be carried out on an otherwise untreated metal surface to improve the corrosion resistance and paint adhesion thereof.)

For example, the treatment composition can be applied by spray coating, roller coating, or dipping. The temperature of the solution applied can vary over a wide range, but is preferably from 70° F. to 160° F.

After application of the treatment solution to the metal surface, the surface can optionally be rinsed, although good results can be obtained without rinsing after treatment. Rinsing may be preferred for some end uses, for example, in electrocoat paint application.

Optionally, the treated metal surface is dried. Drying can be carried out by, for example, circulating air or oven drying. While room temperature drying can be employed, the use of elevated temperatures is preferred to decrease the amount of drying time required.

After drying (if desired) the treated metal surface is then ready for painting (with or without the Polymer Materials of the present invention) or the like. Suitable standard paint or other coating application techniques such as brush painting, spray painting, electro-static coating, dipping, roller coating, as well as electrocoating, may be employed. As a result of the treatment step of the present invention, the conversion coated surface has improved paint adhesion and corrosion resistance characteristics.

Further understanding of the present invention can be had from the following illustrative examples. As used herein "salt spray" refers to salt spray corrosion resistance measured in accordance with ASTM-B117-61. As used herein, "Scotch Tape Adhesion" refers to the 180° T-bend adhesion test as described in ASTM-D3794-79. In summary, panels are scribed in the center and subjected to the ASTM tests. The rating tests for corrosion are measurements of the amount of "creeping" the paint does from the scribe in units of 1/16 of an inch. The superscripts represent the number of spots that are present.

EXAMPLE I

A polymer of the present invention is made as follows. A resin flask is charged with 400 mls Propasol P (a propoxylated propane solvent obtained from Union Carbide Corp., Danbury, Conn.) and 160 g Resin M (obtained from Maruzen Oil MW=5000). A slurry of 263.3 g N-methyglucamine in 400 deionized water is added, and the mixture is warmed to 60°–65° C. while stirring. Next, 100.2 mls of 37% formaldehyde is added over one and one-half hours. The mixture is then warmed to 90° C. and held for six hours. After cooling, the mixture is diluted to 9.6% solids with deionized water. The pH of the final solution is 9.1 and the solution comprises an N-methyl-glucamine derivative.

Dilute solutions of the above formulation containing HF and/or $H_2TiF_6$ and sometimes Aerosil 200 are applied to bare aluminum metal as follows. In a typical aluminum treatment operation, aluminum panels are cleaned using Parco* Cleaner 339 for 10 seconds at 155° F., rinsed for 10 seconds with hot water, squeege dried, run through a roller-coater squeegee containing the treatment solution, then flash dried in a 200° F. oven for 30 seconds. Treated panels are then painted with various paints and subjected to 504 hours acetic acid accelerated testing and compared to B 722/Parcolene 10 controls. Test results are set forth in Tables I–III. All percentages refer to percent solids in the respective treatment solution.

TABLE I

Accelerated Testing Results - DuPont Lucite 21000 Paint

| N-methyl-glucamine Derivative | Treatment Solution $H_2TiF_6$ | Aerosil 200 | pH | 504 Hrs. Acetic Acid Salt Spray |
|---|---|---|---|---|
| 0.5% | — | — | 3.2 | N/N |
| 0.5% | — | — | 4.5 | N/N |
| 0.5% | 0.1% | — | 4.0 | MD9/0-1$^s$ |
| 0.2% | — | — | 4.5 | N/Very Few |
| 0.5% | — | 0.5% | 3.2 | N/N |
| 0.3% | — | 0.7% | 4.5 | N/N |
| 0.3% | 0.1% | 0.7% | 3.0 | N/N |
| 2-(methylamino)ethanol Derivative | | | | |
| 0.5% | — | — | 3.2 | D9/MD6 0-1$^s$ |
| 0.5% | 0.1% | — | 3.0 | N/M6 |
| diethanolamine Derivative | | | | |
| 0.5% | — | — | 3.2 | 0-2$^s$/VF8 0-1$^s$ |
| 0.5% | 0.1% | — | 3.0 | 0-1$^s$/N |
| B 722/Parcolene 10 Control | | | | N/N |
| Clean only control | | | | D8/D4 0-3$^s$ |

TABLE II

Accelerated Testing Results - Glidden Polyure 602-W166 Paint

| N-methyl-glucamine Derivative | Treatment Solution $H_2TiF_6$ | Aerosil 200 | pH | 504 Hrs. Acetic Acid Salt Spray |
|---|---|---|---|---|
| 0.5% | — | — | 4.5 | N/N |
| 0.5% | 0.1% | — | 4.0 | N/F9 |
| 0.3% | 0.1% | 0.7% | 3.0 | N/N |
| 0.2% | — | — | 4.5 | N/N |
| 2-(methylamino)ethanol Derivative | | | | |
| 0.5% | — | — | 3.2 | 0.1$^s$/VF$^4$ 0-3$^s$ |
| 0.5% | 0.1% | — | 3.0 | 0.1$^s$/VF6 0-2$^s$ |
| dietholamine Derivative | | | | |
| 0.5% | — | — | 3.2 | n/0-1$^{2s}$ |
| 0.5% | 0.1% | — | 3.0 | N/N |
| B 722/Parcolene 10 Control | | | | N/N |
| Clean only control | | | | 0-2$^s$/0-1$^{2s}$ |

TABLE III

Accelerated Testing Results - PPG-ILW-11704 Paint

| N-methyl-glucamine Derivative | Treatment $H_2TiF_6$ | Solution pH | 504 Hrs. Acetic Acid Salt Spray |
|---|---|---|---|
| 0.5% | — | 3.2 | N/N |
| 0.5% | — | 4.5 | N/N |
| 0.5% | 0.1% | 3.0 | 0-1$^s$ |
| 2-(methylamino)ethanol Derivative | | | |
| 0.5% | — | 3.2 | 0-1$^s$/0-1$^s$ |
| 0.5% | 0.1% | 3.0 | 0-1$^s$/0-1$^s$ |
| diethanolamine Derivative | | | |
| 0.5% | — | 3.2 | 0-1$^s$/FM9 0-1$^s$ |
| 0.5% | 0.1% | 3.0 | 0-1$^s$/VF9 |
| B 722/Parcolene 10 Control | | | N/N |
| Clean only control | | | 0/1$^s$VF6 0-2$^{3s}$ |

EXAMPLE II

In a typical steel treatment operation, the steel is initially cleaned by a mineral spirits wipe, followed by Parco* Cleaner 338 for 60 seconds at 160° F., hot water rinsed 30 seconds, 60 seconds B-1000 treatment at 155°

F., 30 seconds cold water rinse, and then post-treated with the N-methyl-glucamine derivative of Example I. Some of the panels were rinsed after post-treatment, others were not rinsed. All panels were then baked in a 350° F. oven for 5 minutes. The treated panels were painted with Duracron 200 paint. The paint was scribed, and the panels subjected to salt spray accelerated testing for 504 hours, and compared to Parcolene 95 and Parcolene 60 controls. Test results for two variations are in Table IV.

TABLE IV

| Post-Treatment | Conc./pH | 504 Hrs. Salt Spray |
|---|---|---|
| Parcolene 60 Controls | —/4.3 | N |
| 2-(methylamino)ethanol Derivative | 0.1%/6.3 | 0–2$^s$ |
| Diethanolamine Derivative | 0.1%/6.3 | 0–1 |
| Deionized Water | —1— | 4–5 |
| N-methyl-glucamine Derivative | 0.1%/7.9 | 0–1$^s$ |
| N-methyl-glucamine Derivative | 0.1%/6.3 | 0–1$^{2s}$ |
| Metylbutylamine Derivative | 0.1%/6.3 | 1–1$^{2s}$ |

EXAMPLE III

Into a one (1) liter reactor equipped with a reflux condensor, nitrogen sparge, thermocouple, and addition funnel was added 450 ml of butyl cellosolve (Union Carbide). To the solvent over a 90 minute period was slowly added 180 grams of poly-4-vinylphenol powder (MW=5,000) with good agitation. The temperature was then increased to 100° C. to dissolve any resin from the walls of the flask and then 89.25 grams of Araldite DY 025, a mono-functional epoxide was added followed by the addition of one (1) gram of N,N-Dimethylbenzylamine. The temperature was gradually increased and the reaction mildly exothermed to 167° C. The reaction was post-heated at 175°–185° C. for an additional 3 hours and then cooled. The final solids of the reaction was 40.3% (baked at 350° C. for 15 minutes) indicating a 99% completion of the reaction.

The epoxide modified poly-4-vinylphenol derivative from above was used in the preparation of a Mannich derivative as cutlined below. To the above reaction was added 90.13 grams of 2-(N-methylamino)-ethanol and the reaction heated to 50° C. Over a 45 minute period 97.4 grams of a 37% formaldehyde solution was then added and then the reaction was post-heated for the first 2 hours at 50° C. and then 3 hours at 80° C. The reaction was found to be complete by titration for residual formaldehyde.

A portion of the above solution was adjusted to a pH of 6.5 with phosphoric acid and diluted to 17% solids with deionized water. Zinc phosphated cold rolled steel panels (Bonderite Ep-1) were dipped into the diluted solution of the above polymer and a DC current applied to the panel where the panel was made the cathode and a 316 stainless steel panel was made the anode. The panels were withdrawn from the treatment bath, rinsed with deionized water and oven baked at 400° F. for 20 minutes. A coating weight of approximately 0.5 mils was attained. When tested by treatment with Methyl ethyl ketone and simultaneously rubbed with a cloth, solvent resistance of over 100 rubs was demonstrated.

The above polymer solution in water was also cast on a zinc phosphated cold rolled steel panel by the use of a draw-down bar and then baked at 400° C. for 20 minutes. Again over 100 MEK rubs resulted after the oven bake, while without an oven curing step only 1 to 3 MEK rubs were obtained. The results indicate that the Mannich derivative of the polymer above is self-crosslinking and can be used to form a coating on a metal surface by either casting a film or by cathodic electrodeposition. Good solvent resistance can be attained without the addition of external crosslinking agents although added external crosslinking agents are not expressly excluded.

EXAMPLE IV

A Mannich adduct of poly-4-vinylphenol with N,N-diallylamine was prepared as above by reacting the following ingredients.
1. 131.2 grams 30.5% poly-4-vinylphenol in Proposal P (Union Carbide)
2. 27.5 grams of Propasol P
3. 33.4 grams of N,N-diallylamine (Aldrich Chemical CO)
4. 26.4 grams of 37.9% formaldehyde solution.

The ingredients were mixed and reacted first for five hours at 50° C. and then 2 hours at 80° C. The reaction was followed by the disappearance of formaldehyde and the reaction stopped when 99% complete.

EVALUATION OF SELF-CROSSLINKING REACTION

The reaction mixture of poly-4-vinylphenol, diallylamine and formaldehyde from above was diluted to 17.5% solids and cast on a cleaned aluminum panel (#3003 alloy). A wet film weight of 3 mils and a dry film weight of approx. 1 mil was attained. The bake conditions were 350° C. for ten minutes. MEK (methyl ethyl ketone) solvent resistance of 500+ double rubs using automated test equipment was obtained.

The above diallylamine Mannich adduct of poly-4-vinylphenol was mixed in approximately 10 parts Mannich to 12 parts Monsanto RJ-101 resin (a stryene-allyl alcohol copolymer). This polymeric coating formulation was cast on an aluminum panel using a draw down bar and baked in a convection oven at 350° F. for 10 minutes. The cured coating did not fail even after 500+ MEK double rubs.

A coating cast from only the Monsanto RJ-101 polymer failed in approximately 8–10 MEK rubs. The above results indicate that the Mannich derivatives of polyvinylphenols are excellent crosslinking agents for polymeric systems or can be used as polymeric coatings possessing self-crosslinking properties.

EXAMPLE V 80 grams of a poly-4-vinylphenol-methyl methacrylate copolymer from Maruzen Oil Co. of U.S.A. Inc., New York, N.Y. (Mw=14,090 and Mn 6,800 PVP/MMA ratio=57/43 by weight) is dissolved in 160 mls of propasol p in 160 mls of deionized water. 29.2 mls (0.36 equivs) of 99% methylethanolamine is added, followed by 160 mls deionized water. The mixture is brought to 40°–50° C., then 29.3 grams of a 37% solution of formaldehyde are added (0.36 equivalents) dropwise over a one hour period while maintaining the reaction at 40°–50° C. The mixture is then warmed to 80° C. and maintained at this temperature for four (4) hours. After cooling to ambient temperature, 56.7 grams of a 30% hydrogen peroxide solution is added and allowed to stir overnight at 35° C. The above solution is then neutralized to a pH of 6 and diluted to 15% solids by the addition of 517 mls of deionized water. By the synthesis of the amine oxide of the Mannich adduct, much less acid is needed to produce a water soluble polymer.

What is claimed is:

1. A polymer compound comprising:
a copolymer material wherein at least one portion of said co-polymer has the structure:

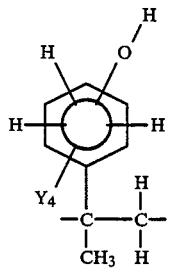

wherein $y_4$ is:

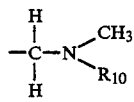

$R_{10}$ is a hydroxy-alkyl substituent resulting from the reduction of an imine generated by the condensation of an amine and an aldose, ketose or mixture thereof; and at least a fraction of said portion is polymerized with acrylonitrile.

2. A composition comprising (a) a polymer compound according to claim 1 and (b) a surface treatment carrier having (a) dissolved or dispersed therein.

3. A composition according to claim 2 wherein the carrier comprises water.

4. A composition according to claim 2 wherein the carrier is aqueous and the polymer has been neutralized with an acid.

5. A composition according to claim 4 wherein the acid is carbonic acid.

6. A composition according to claim 4 having a pH of from about 0.5 to about 14.

7. A composition according to claim 6 having a pH of from about 2.0 to about 12.

8. A composition according to claim 2 wherein said polymer compound comprises about 0.001 to about 80% by weight of the final composition.

9. A composition according to claim 8 wherein said polymer compound comprises from about 0.001% to about 10% of said composition.

10. A composition according to claim 9 wherein said polymer compound comprises from about 0.001 to about 5% of said composition.

11. A composition according to claim 10 wherein said polymer compound comprises from about 0.025% to about 1% of said composition.

12. A composition according to claim 8 wherein said polymer compound comprises from about 1% to about 80% of said composition.

13. A composition according to claim 6 which additionally comprises a complex fluoride material.

14. A composition according to claim 2 which additionally comprises a dissolved or dispersed compound that includes compounds of titanium, zirconium, hafnium, silicon, or mixtures thereof.

15. A composition according to claim 2 which additionally comprises an oxide of silicon, titanium, tin, aluminum, cobalt, nickel, or mixtures thereof.

16. A composition according to claim 2 which additionally comprises a paint system additive selected from the group consisting of a film forming resin, a pigment, a binder, particulate zinc, or mixtures thereof.

17. The polymer of claim 1 wherein said polymer is condensed with a second compound selected from the group consisting of phenols, tannins, novalak resins, lignin compounds, together with aldehydes, ketones or mixtures thereof, to produce a condensation resin product, said condensation resin product then being further reacted by the addition of "Z" to at least a portion of it by reacting said resin product with (1) an aldehyde or ketone and (2) a secondary amine producing a final adduct which can react with an acid.

18. A composition according to claim 17 wherein said second compound is selected from the group consisting of phenol, alkylphenol, arylphenol, cresol, resorcinol, catechol, pyrogallol, and mixtures thereof.

* * * * *